A. M. STEWART.
JOINTED ROD.
APPLICATION FILED MAR. 24, 1921.
1,435,028.
Patented Nov. 7, 1922.
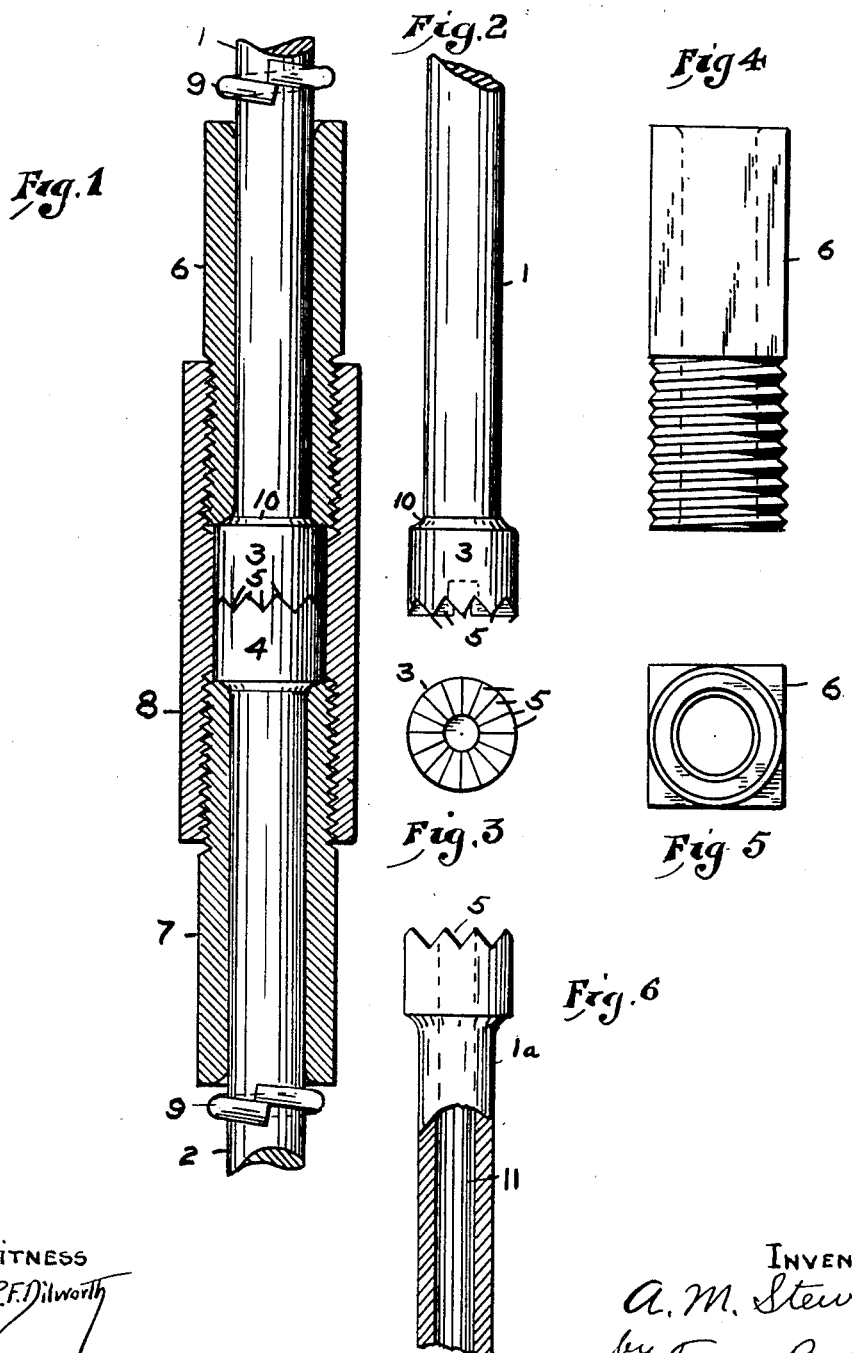

Patented Nov. 7, 1922.

1,435,028

UNITED STATES PATENT OFFICE.

ANDREW M. STEWART, OF TOLEDO, OHIO.

JOINTED ROD.

Application filed March 24, 1921. Serial No. 455,293.

*To all whom it may concern:*

Be it known that I, ANDREW M. STEWART, a citizen of the United States, residing at Toledo, in the county of Lucas and State of Ohio, have invented new and useful Improvements in Jointed Rods, of which the following is a specification.

My invention relates to jointed rods, and the objects thereof are to produce jointed metal rods which are strong at their most vital points, which can have their cross-sections made comparatively small, which permit the use of comparatively low heats for shaping the ends of the rods, and which can be made by a few simple operations and at a low cost. This invention permits the use of certain high grade steels, which, if used in the common rods of the same type as herein shown, would present much difficulty for successful forging operations. Other objects appear hereinafter.

On the accompanying drawings, Fig. 1 is a combined longitudinal section and side elevation of portions of two rods and the means for joining them end to end; Fig. 2, a side elevation of the end portion of one rod; Fig. 3, an end elevation of Fig. 2; Fig. 4, a side elevation of one of the bushings; and Fig. 5, an end elevation of Fig. 4. Fig. 6 is a section partly in side elevation, showing a hollow rod.

On the drawings, 1 and 2 designate two metal rods in axial alinement, provided with the heads 3 and 4 having uniform radial wedge-shaped teeth 5 at their outer ends. The teeth 5 on the heads 3 and 4 are correspondingly shaped so that they will automatically interfit and will self-center the rods when the headed ends of the rods 1 and 2 are brought together axially.

The rods 1 and 2 have thereon the bushings 6 and 7 arranged just back of the heads 3 and 4. The bushings are rotatable and longitudinally slidable on their respective rods and have their ends nearest the heads threaded externally and their other ends made angular in cross-section, as shown in Fig. 5, so that a nut wrench may be applied to the bushings for rotating them. The ends of the bushings constitute shoulders or seats for the untoothed ends of the heads. I have shown both bushings threaded into the sleeve, but one bushing may be integral with the sleeve, when only one end of the rod is headed.

The sleeve 8 has its interior central portion shaped to fit the exterior surfaces of the interlocked heads 3 and 4, while its interior end portions are internally threaded to receive the threaded ends of the bushings 6 and 7. The bushings are screwed into the sleeve until their outer ends, which engage the rear ends of the heads, cause the teeth 5 to become firmly intermeshed and all the five parts of the joint are made into a rigid unit.

Preferably the rods will have thereon some means, as the spring clips 9, which will grip the rods tightly and hold the bushings near the ends of the rods when the joint is unscrewed. The clip shown is a turn of a helical coil, its diameter being slightly smaller than that of the rod 1 or 2. The clips are slid upon the rods before the latter are provided with heads, as is also the case with the bushings. They hold the bushings close to the ends of the heads, where they are convenient for screwing into the sleeve.

It is seen that both the ends of the rods may have heads and sleeves of uniform character so that they may be interchangeable, that is, so that any two ends of different rods with heads and bushings may be fitted together with a sleeve as shown in Fig. 1. The sleeve 8 being of greater diameter than the rods, takes all the wear on the well tube when the jointed rod is used as a pump-rod or sucker-rod. When the sleeve is worn out, it may readily be replaced by another one. The jointed rod is of comparatively light weight and small size. The rods have no threads or unsupported changes in cross-section to weaken them. The radius fillet 10 takes care of stresses due to eccentric strains.

Preferably the rods are each made of one solid piece of steel, the ends being preferably upset to avoid the use of such excessive heat as is required to weld the heads in place. The high heat for welding is liable to injure steel and leave it weak, whereas the lower heat and the mechanical work of upsetting improves the structure of steel. The metal at the ends of the rods can be gathered and formed at a single upsetting operation. The rods 1 and 2 can be made from standard sizes of stock, and the bushings 3 and 4 and the sleeve 8 from bar or tubing stock.

On Fig. 6 I show my invention applied to hollow rods. I show therein a rod $1^a$ with the axial opening 11. Rods like $1^a$ may be assembled in the same manner as the rods 1 and 2 in Fig. 1.

I claim:—

1. A pair of headed rods placed end to end, beveled interlocking teeth on the heads for self-alining and self-centering the rods and for preventing their relative axial rotation, a sleeve surrounding the said heads and having its ends threaded, and a rotatable threaded bushing on each rod, working in the threads of the sleeve and against the inner ends of the heads to force the heads toward each other and bind the rods, sleeve and bushings into a rigid unit.

2. A pair of metal rods placed end to end, having their adjacent ends upset and provided with beveled interlocking teeth for self-alining and self-centering the rods, a metal sleeve surrounding the upset ends, bushings rotatable on the rods and constructed to bear on the inner ends of the upset portions of the said ends, and means cooperating between the sleeve and bushings whereby the bushings may be caused to approach each other to force the upset ends toward each other and bind the rods, sleeve, and bushings into a rigid unit.

3. A pair of headed rods placed end to end, self-alining, self-centering, and interlocking means on the heads preventing their relative axial rotation, a sleeve surrounding the said heads and having its ends threaded, a rotatable threaded bushing on each rod, working in the threads of the sleeve and against the inner ends of the heads to force the heads toward each other and bind the rods, sleeve and bushings into a rigid unit, the rods each having its cross-section near its head of uniform size, and self-clamping means gripping the portions of the rods having the said uniform size for limiting the movement of the bushings when they are free to move longitudinally.

4. A pair of rods, each having a terminal head, the rods being placed end to end with the outer ends of the two heads in mutual engagement and the said ends of the heads having beveled interlocking teeth for self-alining and self-centering the rods and for preventing the relative rotation of the rods, a sleeve surrounding the said heads and having one of its ends threaded, a shoulder within the sleeve to support the inner end of the head on one rod, and a bushing rotatable on the other rod and working in the threads of the sleeve and against the inner end of the second head to force the opposing ends of the heads towards each other and bind the described parts into a rigid unit.

Signed at Toledo, Ohio, this 22nd day of March, 1921.

A. M. STEWART.